(12) United States Patent
Xu

(10) Patent No.: US 10,001,271 B2
(45) Date of Patent: Jun. 19, 2018

(54) LED LAMP FORMING MATERIAL AND LIGHT-PERVIOUS WATERPROOF LED LAMP

(71) Applicant: Songyan Xu, Hangzhou (CN)

(72) Inventor: Songyan Xu, Hangzhou (CN)

( * ) Notice: Subject to any disclaimer, the term of this patent is extended or adjusted under 35 U.S.C. 154(b) by 8 days.

(21) Appl. No.: 15/114,856

(22) PCT Filed: Jan. 19, 2015

(86) PCT No.: PCT/CN2015/071042
§ 371 (c)(1),
(2) Date: Jul. 28, 2016

(87) PCT Pub. No.: WO2015/113471
PCT Pub. Date: Aug. 6, 2015

(65) Prior Publication Data
US 2016/0377281 A1    Dec. 29, 2016

(30) Foreign Application Priority Data

| Jan. 28, 2014 | (CN) | .......................... 2014 1 0041677 |
| Jan. 28, 2014 | (CN) | .......................... 2014 1 0041678 |
| Jan. 28, 2014 | (CN) | .......................... 2014 1 0041682 |
| Jan. 28, 2014 | (CN) | ..................... 2014 2 0055350 U |

(51) Int. Cl.
| *F21V 31/00* | (2006.01) |
| *F21K 9/90* | (2016.01) |
| *F21V 15/01* | (2006.01) |
| *F21V 23/00* | (2015.01) |
| *F21V 9/06* | (2018.01) |
| *C08K 5/00* | (2006.01) |
| *F21Y 115/10* | (2016.01) |

(52) U.S. Cl.
CPC .......... *F21V 31/005* (2013.01); *C08K 5/0008* (2013.01); *F21K 9/90* (2013.01); *F21V 9/06* (2013.01); *F21V 15/01* (2013.01); *F21V 23/007* (2013.01); *F21V 31/00* (2013.01); *F21Y 2115/10* (2016.08)

(58) Field of Classification Search
CPC ........ F21V 31/005; F21V 23/007; F21V 9/06; F21V 15/01; F21V 9/90
See application file for complete search history.

(56) References Cited

FOREIGN PATENT DOCUMENTS

| CN | 86106991 A | 5/1988 |
| CN | 1945103 A | 4/2007 |

(Continued)

*Primary Examiner* — Joseph L Williams
(74) *Attorney, Agent, or Firm* — Gokalp Bayramoglu

(57) ABSTRACT

The present invention relates to an LED lamp forming material with an outstanding weather resistance performance and a reliable seal performance, and also relates to a light-pervious waterproof LED lamp manufactured by the LED lamp forming material. A lamp forming mold is prepared according to a shape of the light-pervious waterproof damp required by a user, a circuit board including a driving circuit and an LED light source is suspended within a molding cavity of the LED lamp forming mold, a PVC paste or a modified PVC paste is injected into the molding cavity, heating is performed for 15 to 30 minutes, the PVC paste or the modified PVC paste within the molding cavity of the LED lamp is solidified, the solidified LED waterproof lamp is taken out of the molding cavity, so as to obtain the light-pervious waterproof LED lamp.

21 Claims, 1 Drawing Sheet

(56) References Cited

FOREIGN PATENT DOCUMENTS

| | | |
|---|---|---|
| CN | 101592317 A | 12/2009 |
| CN | 201657944 U | 12/2010 |
| CN | 102454908 A | 5/2012 |
| CN | 102628562 A | 8/2012 |
| CN | 202432299 U | 9/2012 |
| CN | 103819842 A | 5/2014 |
| CN | 103819843 A | 5/2014 |
| CN | 103822119 A | 5/2014 |
| CN | 204127693 U | 1/2015 |

LED LAMP FORMING MATERIAL AND LIGHT-PERVIOUS WATERPROOF LED LAMP

TECHNICAL FIELD

The invention relates to a LED lamp forming material with an outstanding weather resistance performance and a reliable seal performance, and also relates to a light-pervious waterproof LED lamp manufactured by the LED lamp forming material. The light-pervious waterproof LED lamp has a good ultraviolet resistance performance and an outstanding weather resistance performance, and can be independently used as a housing of an LED light source, work outdoors or underwater for a long time, and prevent steam penetration. The invention pertains to a material and manufacturing field for a special housing of an outdoor waterproof light.

BACKGROUND

1. CN101592317A, entitled "Outdoor Surface-mounted LED lamp Housing Material", comprising epoxy resin, antistatic agents and ultraviolet resistance material. It further includes light stabilizers. However, the material has deficiencies. First, the lights fail and get damaged due to the water penetration, caused by epoxy resin and silicone being immersed in a high humidity environment or water for a long time, and the materials are not waterproof over the long term. Second, the epoxy resin and the silicone become yellow, cracked and the housing detaches, resulting in steam entering into the light source and rendering the light source ineffective.

2. CN102454908A, entitled "Exposed Waterproof LED lamp string and Manufacturing Method Thereof", combines LED lamps, PCD circuit board, and anti-ultraviolet PU leads together and then cures under the high temperature of 50-60° C. This disclosure solves the problems of secure connection between modified epoxy resin and PVC cables, and the waterproof treatment. In the practices, several perforated lamps are connected together in parallel in accordance with a certain rule. Each perforated lamp includes a LED bead, a circuit board, a rubber sleeve and leads. The structure and arrangement are described as below: 1) The LED bead is located at the top of the perforated light; 2) the circuit board includes a control circuit electrically connected to the LED bead, for controlling the LED bead; 3) the external power supply is connected to the control circuit by the leads; 4) the sleeve is cylindrical and filled with waterproof glue, and the LED bead, circuit board and the connection between the leads and the circuit board are encased in the sleeve.

3. CN202432299U, entitled "A Waterproof LED Line Source", includes a mounting aluminum frame, a PC tube connected to the mounting aluminum frame, a PCB board located within the PC tube, multiple LED lamps located on the PCB board and two plugs provided at the two ends of the mounting aluminum frame. The PCB board is filled and sealed with epoxy resin, silicone is provided on the connections among mounting aluminum frame, PC tube, PCB board and the plugs, and all the edges of the LED line source are also sealed with the silicone.

The deficiencies of these prior arts are illustrated as below: first, the lights fail and get damaged due to the water penetration, caused by epoxy resin and silicone not being water proof in the long term and being immersed in a high humidity environment or water for a long time; second, the epoxy resin and the silicone become yellow, and cracked and the housing detaches, resulting in steam entering into the light source, rendering the light source ineffective.

4. CN102628562A, entitled "LED light Bar with a fully waterproof filling and sealing structure and Manufacturing Method Thereof" discloses a LED light bar body (1); and an extruded fully waterproof filling and sealing structure (2) encircling along the LED light bar body (1). The disclosure also discloses a filling and sealing method of a LED light bar, including: providing a LED light bar body (1); extruding and molding the silicone material on the LED light bar body (1) by the extrusion process, to form an extruded fully waterproof filling and sealing structure encircling along the LED light bar body (1). The waterproof extrusion material for extruding the LED light bar in the extrusion process is preferably PVC, TPU or the combination of PVC and TPU. These extrusion materials are not only used for extruding and molding to fit the contour of the LED light bar, but also have good heat dissipation, light transmission and weather resistance, which is especially suitable for encasing the LED light bar to ensure the good light transmission of the LED light bar. Therefore, the waterproof filling and sealing structure made of by these extrusion materials does not affect the normal work, light emitting and heat dissipation. The deficiency of this prior art is because of the different properties of the two materials. PVC, TPU or the combination of PVC and TPU is adopted in the extrusion process to manufacture the LED light bar, and the waterproof filling material is used for sealing. The thermal expansion and contraction coefficients of these two materials are different. When used outdoors or immersed in a high humidity environment or water for a long time, there would be water penetration, which leads to the lamp failing, getting damaged, and becoming yellow, or cracked and the housing detaches, rendering the light source ineffective.

SUMMARY OF THE INVENTION

The design objectives of this invention are to avoid the deficiencies of the prior arts and provide a LED lamp forming material with an outstanding weather resistance performance and a reliable seal performance, and also provide a light-pervious waterproof LED lamp manufactured by the LED lamp forming material. The light-pervious waterproof LED lamp has a good ultraviolet resistance performance and an outstanding weather resistance performance, and can be independently used as a housing of an LED light source, work outdoors or underwater for a long time, and prevent steam penetration.

The design solution is used to achieve the above design objectives. One of the technical features of the invention is that PVC paste is used as a LED lamp forming material. The objective of this design is to changes a long term technical prejudice from the one skilled in the art that PVC can only be used in soft material field due to the good dispersity of the PVC paste, for example, artificial leather, vinyl toy, soft trademark, wallpaper, paint, and plastic foam etc. and cannot be used as a LED lamp forming material. The invention takes the opposite track to use PVC paste as a LED lamp forming material, which makes the LED lamps in any shape upon the needs from the users. In addition, the formed LED lamps are easy to pour, pervious to light, heat resistant, shock resistant and tear resistant, and they can be manufactured with small quantities and diversified categories. More importantly, this material can make the LED lamp work outdoors for a long term, be fully sealed underwater and usable with weather resistance at any time. Another technical feature of the invention is that the seal housing of the LED light sources is made of PVC paste. The objective of this design is to changes a long term technical prejudice from the one skilled in the art that PVC can only be used in soft material field due to the good dispersity of the PVC paste, for example, artificial leather, vinyl toy, soft trademark, wallpaper, paint, and plastic foam and etc. cannot be used as a LED lamp forming material. The invention takes the opposite track to use PVC paste as a LED light source carrier, which makes the processing equipment inexpensive, the mold simple and cheap, and the LED lamp in any shape upon the needs from the users. In addition, it is easy to foam and the manufacture products are pervious to light, heat resistant, shock resistant and tear resistant, and they can be manufactured with small quantities and diversified categories, which makes the LED lamps work outdoors for a long term, be fully sealed underwater and used with weather resistance at any time.

Absorbers for absorbing the ultraviolet rays are added into PVC paste in the invention. Because ultraviolet ray absorbers can absorb the ultraviolet rays from the sunlight and the fluorescent source without changes of its own composition, it can convert the high energy ultraviolet rays into thermal energies or nondestructive longer light waves that are released, protecting the material to which the absorbers where added from the destruction of the ultraviolet rays. The ultraviolet ray absorbers are added into the PVC paste, effectively preventing the ultraviolet rays in the sunlight from the destruction of the housing of the LED lamp, extending the life span of the LED lamp.

The purposes of adding the antioxidants into the PVC paste in the invention are illustrated as below. Plasticized PVC paste plastic easily age under the influences of light, heat, oxygen, solvent, auxiliaries and HCL, i.e., degrade or cross-link, to make the physical and mechanical properties worse, and thus shorten the operating life. Antioxidants are added into the PVC paste in the invention, which can effectively inhibit or decrease the reaction rate of thermal oxidation and photo-oxidation, significantly improve the heat resistance and light resistance of the plasticized PVC paste plastic, delay degradation and aging process of the plasticized PVC paste plastic, improve the weather resistance of the housing of the waterproof LED lamp, and extend the life span of the plasticized PVC paste plastic.

The purposes of adding the low temperature plasticizers into the PVC paste is that the low temperature plasticizers are compatible with the PCV paste resin, not easy to segregate and exude, and have good plasticizing effects. In addition, the low temperature plasticizers can decrease the glass temperature of the plasticized PVC paste plastic to make it flexible, which improves the low temperature resistance of the plasticized PVC paste plastic and has better operating performance in a cold area.

The purposes of adding the stabilizers into the PVC paste in the invention are that PVC paste is plasticized or used under high temperature, and releases HCL very easily, so as to form an unstable polyene structure. At the same time, autocatalysis of HCL can make PVC further degrade. In addition, the existence of oxygen, iron, aluminum, zinc, tin, copper and cadmium would catalyze the degradation of PCV to accelerate aging. Therefore, the plastic would have poor performances, for example, discoloration, deformation, cracks, reduction in mechanical strength, reduction in insulation and fragility. To solve these problems, various kinds and quantities of stabilizers should be added into the PVC paste plastic.

Technical solution 1: a LED lamp pouring forming material. The LED lamp pouring forming material is PVC paste or modified PVC paste.

Technical solution 2: a manufacturing method of a LED lamp pouring forming material; in light of the extreme outdoor weather conditions, an additive or more than one additives are added into 100 percent by weight of PVC paste or modified PVC paste.

Technical solution 3: a light-pervious waterproof LED lamp; the LED light source is made up of one or multiple arranged LEDs, and the LED light source is hermetically encased to form a light-pervious waterproof lamp.

Technical solution 4: a manufacturing method of a light-pervious waterproof LED lamp, comprising: preparing a lamp forming mold according to a shape of the light-pervious waterproof light required by a user; suspending a circuit board including a driving circuit and an LED light source within a molding cavity of the LED lamp forming mold; injecting PVC paste or modified PVC paste into the molding cavity of the LED lamp forming mold, and heating for 15 to 30 minutes to solidify the PVC paste or the modified PVC paste within the molding cavity of the LED lamp; taking the solidified waterproof LED lamp out of the molding cavity of the LED lamp forming mold to obtain the light-pervious waterproof LED lamp.

The advantageous effects of the invention are illustrated as below:

In contrast to the prior arts, firstly, PVC paste is used as a LED lamp forming material, and it has good ultraviolet ray resistance, low temperature resistance and weather resistance, and also has a V-2 to V-0 flame retardant level; secondly, the material costs, manufacturing costs and processing costs of the products are reduced, and it has a short production cycle and efficient productivity; thirdly, the shape of the LED lamp can be formed according to the needs of the users, which changes a long term technical prejudice from the one skilled in the art that PVC cannot be used as a LED lamp forming material.

DETAILED DESCRIPTION OF THE INVENTION

Figure 1:
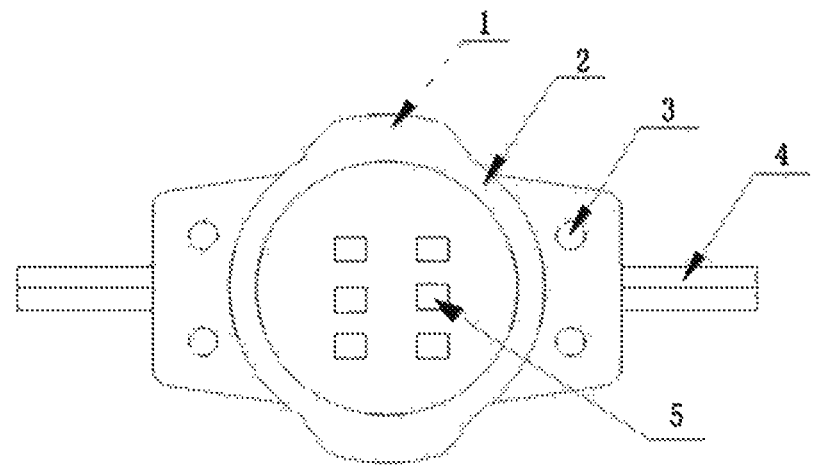
FIG. 1 is a structural schematic drawing of a light-pervious waterproof LED lamp.

Embodiment 1: a LED lamp pouring forming material. The LED lamp pouring forming material is PVC paste or modified PVC paste. The LED lamp is made up of one or more than one LED light sources.

Embodiment 2: based on Embodiment 1, the PVC paste includes an ultraviolet ray absorber, and 0.1 to 0.8 percent by weight of ultraviolet ray absorber is added into 100 percent by weight of PVC paste resin. The ultraviolet ray absorber is ultraviolet ray absorber UV-531, ultraviolet ray absorber UV-327, ultraviolet ray absorber UV-326, ultraviolet ray absorber UV-74, ultraviolet ray absorber UV-9, ultraviolet ray absorber UV-P or a combination thereof.

Embodiment 3: based on Embodiment 1, the PVC paste includes an antioxidant, and 0.5 to 1 percent by weight of antioxidant is added into 100 percent by weight of PVC paste resin. The antioxidant is antioxidant2246, antioxidant1520, antioxidant1098, antioxidant1076, antioxidant1010, antioxidant300, antioxidant264, antioxidant168 or a combination thereof.

Embodiment 4: based on Embodiment 1, the PVC paste includes a low temperature resistant additive, and 5 to 20 percent by weight of low temperature plasticizer is added into 100 percent by weight of PVC paste resin. The low temperature resistant additive is Diisodecyl Adipate (DIDA for short), Diisooctyl Adipate (DOA for short), Dioctyl Azelate (DOZ for short), Dibutyl Sebacate (DBS for short), Dioctyl Sebacate (DOS for short), Diisooctyl Sebacate (DIOS for short), or a combination thereof.

Embodiment 5: based on Embodiment 1, the PVC paste includes a stabilizer, and 0.5 to 5 percent by weight of stabilizer is added into 100 percent by weight of PVC paste resin. The stabilizer is Octyl tin mercaptide, Octyl tin oxide, Bis (lauroyloxy) dioctyltin, Dioctyl (maleate) tin, Butylmercaptooxo-stannane, Dibutyltin maleate, Dibutyl tin laurate-maleate, Dibutyl tin laurate-maleate, Dibutyltin oxide, Dimethyltin oxide, Epoxidized soya bean oil, Epoxidised linum usitatiseimum L, or phosphite.

Embodiment 6: based on Embodiment 1, the PVC paste includes a flame retardant plasticizer, and 5 to 15 percent by weight of flame retardant plasticizer is added into 100 percent by weight of PVC paste resin. The flame retardant plasticizer is DP-45, Tritolyl phosphate (TCP), Triphenyl phosphate (TPP), Tributyl phosphate (TBP), Tris(2-ethylhexyl) phosphate (TOP), 2-Ethylhexyl diphenyl phosphate (DPOP) or a combination thereof.

Embodiment 7: based on Embodiments 1-6, a LED lamp pouring forming material is a PVC paste or modified PVC paste. The LED lamp is made up of one or more than one LED light sources. The PVC paste includes an ultraviolet ray absorber, and 0.1 to 0.8 percent by weight of ultraviolet ray absorber is added into 100 percent by weight of PVC paste resin. The ultraviolet ray absorber is ultraviolet ray absorber UV-531, ultraviolet ray absorber UV-327, ultraviolet ray absorber UV-326, ultraviolet ray absorber UV-74, ultraviolet ray absorber UV-9, ultraviolet ray absorber UV-P or a combination thereof. The PVC paste includes an antioxidant, and 0.5 to 1 percent by weight of antioxidant is added into 100 percent by weight of PVC paste resin. The antioxidant is antioxidant2246, antioxidant1520, antioxidant1098, antioxidant1076, antioxidant1010, antioxidant300, antioxidant264, antioxidant168 or a combination thereof. The PVC paste includes a low temperature resistant additive, and 5 to 20 percent by weight of low temperature plasticizer is added into 100 percent by weight of PVC paste resin. The low temperature resistant additive is Diisodecyl Adipate (DIDA for short), Diisooctyl Adipate (DOA for short), Dioctyl Azelate (DOZ for short), Dibutyl Sebacate (DBS for short), Dioctyl Sebacate (DOS for short), Diisooctyl Sebacate (DIOS for short), or a combination thereof. The PVC paste includes a stabilizer, and 0.5 to 5 percent by weight of stabilizer is added into 100 percent by weight of PVC paste resin. The stabilizer is Octyl tin mercaptide, Octyl tin xxide, Bis (lauroyloxy) dioctyltin, Dioctyl (maleate) tin, Butylmercaptooxo-stannane, Dibutyltin maleate, Dibutyl tin laurate-maleate, Dibutyl tin laurate-maleate, Dibutyltin oxide, Dimethyltin oxide, Epoxidized soya bean oil, Epoxidised linum usitatiseimum L, or phosphite. The PVC paste includes a flame retardant plasticizer, and 5 to 15 percent by weight of flame retardant plasticizer is added into 100 percent by weight of PVC paste resin. The flame retardant plasticizer is DP-45S, Tritolyl phosphate (TCP), Triphenyl phosphate (TPP), Tributyl phosphate (TBP), Tris(2-ethylhexyl) phosphate (TOP), 2-Ethylhexyl diphenyl phosphate (DPOP) or a combination thereof.

Embodiment 8: based on Embodiment 1, the LED lamp includes a LED driving circuit.

Embodiment 9: based on Embodiment 1, the LED lamp includes a LED driving circuit and a control chip.

Embodiment 10: based on Embodiments 1-7, a manufacturing method of a LED lamp forming material, in light of the extreme outdoor weather conditions, one or more than one additives are added into 100 percent by weight of PCV paste or modified PVC paste. The additives are an ultraviolet ray absorber, an antioxidant, a low temperature resistant additive, a stabilizer, a flame retardant plasticizer; or a combination of the above two or more than two additives.

Embodiment 11: referring to FIG. 1, based on Embodiment 1, a light-pervious waterproof LED lamp is disclosed. The LED light source is made up of one or multiple arranged LEDs, and the LED light source is hermetically encased by the PVC paste or modified PVC paste, to form a light-pervious waterproof lamp. A sealing structure without an air gap is formed among the LED light source, the driving circuit, the control chip and PVC paste or modified PVC paste. The LED lamp is made up of one or more than one LED light sources. The sealing structure without an air gap refers to a structure as below: there may be a stripping gap between PVC paste or modified PVC paste and the encased components (the LED light source, the driving circuit, the control chip and so on), but the stripping gap is a seal gap without any air.

Embodiment 12: based on Embodiment 1, the LED lamp includes a LED driving circuit, which is hermetically encased.

Embodiment 13: based on Embodiment 1, the LED lamp includes a LED driving circuit and a control chip, which are hermetically encased.

Embodiment 14: based on Embodiment 1, the PVC paste or modified PVC paste includes an ultraviolet ray absorber, and 0.1 to 0.8 percent by weight of ultraviolet ray absorber is added into 100 percent by weight of PVC paste. The ultraviolet ray absorber is ultraviolet ray absorber UV-531, ultraviolet ray absorber UV-327, ultraviolet ray absorber UV-326, ultraviolet ray absorber UV-74, ultraviolet ray absorber UV-9, ultraviolet ray absorber UV-P or a combination thereof.

Embodiment 15: based on Embodiment 1, the PVC paste or modified PVC paste includes an antioxidant, and 0.5 to 1 percent by weight of antioxidant is added into 100 percent by weight of PVC paste. The antioxidant is antioxidant2246, antioxidant1520, antioxidant1098, antioxidant1076, antioxidant1010, antioxidant300, antioxidant264, antioxidant168 or a combination thereof.

Embodiment 6: based on Embodiment 1, the PVC paste or modified PVC paste includes a low temperature resistant additive, and 5 to 20 percent by weight of low temperature plasticizer is added into 100 percent by weight of PVC paste. The low temperature resistant additive is Diisodecyl Adipate (DIDA for short), Diisooctyl Adipate (DOA for short), Dioctyl Azelate (DOZ for short), Dibutyl Sebacate (DBS for short), Dioctyl Sebacate (DOS for short), Diisooctyl Sebacate (DIOS for short), or a combination thereof.

Embodiment 7: based on Embodiment 1, the PVC paste or modified PVC paste includes a stabilizer, and 0.5 to 5 percent by weight of stabilizer is added into 100 percent by weight of PVC paste. The stabilizer is Octyl tin mercaptide, Octyl tin oxide, Bis (lauroyloxy) dioctyltin, Dioctyl (maleate) tin, Butylmercaptooxo-stannane, Dibutyltin maleate, Dibutyl tin laurate-maleate, Dibutyl tin laurate-maleate, Dibutyltin oxide, Dimethyltin oxide, Epoxidized soya bean oil, Epoxidised linum usitatiseimum L, or phosphite.

Embodiment 8: based on Embodiment 1, the PVC paste or modified PVC paste includes a flame retardant plasticizer, and 5 to 15 percent by weight of flame retardant plasticizer is added into 100 percent by weight of PVC paste. The flame retardant plasticizer is DP-45, Tritolyl phosphate (TCP), Triphenyl phosphate (TPP), Tributyl phosphate (TBP), Tris (2-ethylhexyl) phosphate (TOP), 2-Ethylhexyl diphenyl phosphate (DPOP) or a combination thereof.

Embodiment 9: based on Embodiments 1, 1-2 or 1-3, a LED lamp pouring forming material is a PVC paste or modified PVC paste. The LED lamp is made up of one or more than one LED light sources. The PVC paste includes an ultraviolet ray absorber, and 0.1 to 0.8 percent by weight of ultraviolet ray absorber is added into 100 percent by weight of PVC paste. The ultraviolet ray absorber is ultraviolet ray absorber UV-531, ultraviolet ray absorber UV-327, ultraviolet ray absorber UV-326, ultraviolet ray absorber UV-74, ultraviolet ray absorber UV-9, ultraviolet ray absorber UV-P or a combination thereof. The PVC paste includes an antioxidant, and 0.5 to 1 percent by weight of antioxidant is added into 100 percent by weight of PVC paste. The antioxidant is antioxidant2246, antioxidant1520, antioxidant1098, antioxidant1076, antioxidant1010, antioxidant300, antioxidant264, antioxidant168 or a combination thereof. The PVC paste includes a low temperature resistant additive, and 5 to 20 percent by weight of low temperature plasticizer is added into 100 percent by weight of PVC paste. The low temperature resistant additive is Diisodecyl Adipate (DIDA for short), Diisooctyl Adipate (DOA for short), Dioctyl Azelate (DOZ for short), Dibutyl Sebacate (DBS for short), Dioctyl Sebacate (DOS for short), Diisooctyl Sebacate (DIOS for short), or a combination thereof. The PVC paste includes a stabilizer, and 0.5 to 5 percent by weight of stabilizer is added into 100 percent by weight of PVC paste. The stabilizer is Octyl tin mercaptide. Octyl tin xxide, Bis (lauroyloxy) dioctyltin, Dioctyl (maleate) tin, Butylmercaptooxo-stannane, Dibutyltin maleate, Dibutyl tin laurate-maleate, Dibutyl tin laurate-maleate, Dibutyltin oxide, Dimethyltin oxide, Epoxidized soya bean oil, Epoxidised linum usitatiseimum L, or phosphite. The PVC paste includes a flame retardant plasticizer, and 5 to 15 percent by weight of flame retardant plasticizer is added into 100 percent by weight of PVC paste. The flame retardant plasticizer is DP-45, Tritolyl phosphate (TCP), Triphenyl phosphate (TPP), Tributyl phosphate (TBP), Tris(2-ethylhexyl) phosphate (TOP), 2-Ethylhexyl diphenyl phosphate (DPOP) or a combination thereof.

Figure 2:
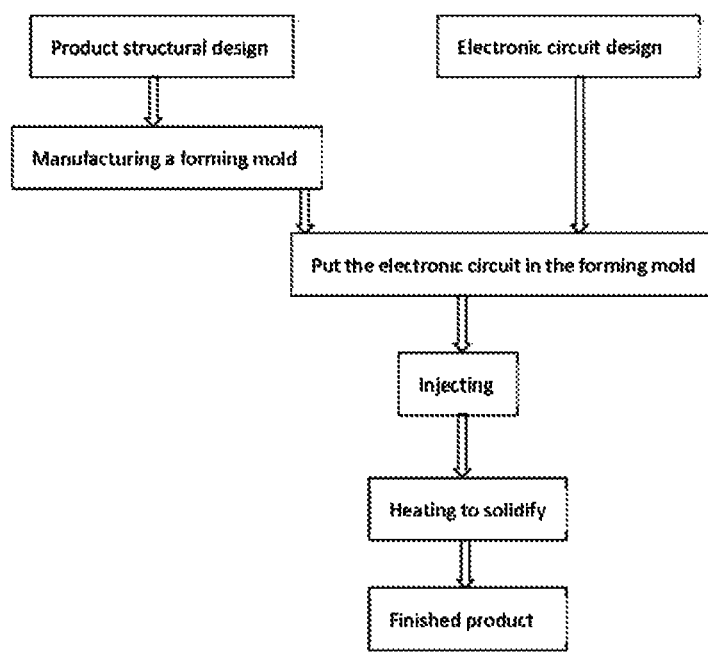
FIG. 2 is a flow chart of a manufacturing method for the product of FIG. 1.

Embodiment 10: referring to FIG. 2, a manufacturing method of a light-pervious waterproof LED lamp is disclosed, comprising: preparing a lamp forming mold according to a shape of the light-pervious waterproof light required by a user; suspending a circuit board including a driving circuit and a LED light source within a molding cavity of the LED lamp forming mold; injecting PVC paste or modified PVC paste into the molding cavity of the LED lamp forming mold, and heating for 15 to 30 minutes to solidify the PVC paste within the molding cavity of the LED lamp; taking the solidified product out of the molding cavity of the LED lamp forming mold to obtain the light-pervious waterproof LED lamp.

Embodiment 11: based on Embodiment 10, preparing a lamp forming mold according to needs of a user; suspending a circuit board including a driving circuit, a control circuit (chip) and a LED light source within a molding cavity of the LED lamp forming mold; injecting PVC paste or modified PVC paste into the molding cavity of the LED lamp forming mold, and heating for 15 to 30 minutes to solidify the PVC paste within the molding cavity of the LED lamp; taking the solidified product out of the molding cavity of the LED lamp forming mold to obtain the light-pervious waterproof LED lamp.

Embodiment 12: based on Embodiments 10 or 11, suspending a circuit board including a driving circuit and a LED light source within a molding cavity of the LED lamp forming mold, to be in a vacuum condition, injecting PVC paste or modified PVC paste into the molding cavity of the LED lamp forming mold.

An example is given according to the above embodiments to illustrate:

A perforated waterproof LED lamp (FIG. 1) is manufactured by the process. The product includes two fasteners 1 and four screw holes 3 and can be secured by fasteners 1 and screw holes 3. The wires 4 are connected from the two ends of the lamp 2. The whole lamp is transparent.

A mold is designed first, and a molding cavity is formed from bakelite, aluminum, cooper, etc. by numerical control machining. Circuit board 5 is suspended within the molding cavity by a pressing block located at which the wires are connected from. PVC paste is injected into the molding cavity and heated for 20 minutes, and then the product is taken out of the molding cavity. Due to the integrated package, the circuit is totally encased by solidified modified PVC paste, and thus the product has good waterproof performance.

It is understood that although the invention is described in detail with the above embodiments, the description is just a simple description about the design ideas of the invention, and is not intended to limit the invention. Any combinations, additions or changes without departing from the design ideas of the invention would fall within protection scope of the invention.

The invention claimed is:

1. A LED lamp forming material, comprising; a PVC paste or a modified PVC paste.

2. The LED lamp forming material of claim 1, wherein the PVC paste or the modified PVC paste includes an ultraviolet ray absorber.

3. The LED lamp forming material of claim 2, wherein the ultraviolet ray absorber is ultraviolet ray absorber UV-531, ultraviolet ray absorber UV-327, ultraviolet ray absorber UV-326, ultraviolet ray absorber UV-74, ultraviolet ray absorber UV-9, or ultraviolet ray absorber UV-P.

4. The LED lamp forming material of claim 1, wherein the PVC paste or the modified PVC paste includes an antioxidant.

5. The LED lamp forming material of claim 4, wherein the antioxidant is antioxidant2246, antioxidant1520, antioxidant1098, antioxidant1076, antioxidant1010, antioxidant300, antioxidant264, or antioxidant168.

6. The LED lamp forming material of claim 1, wherein the PVC paste or the modified PVC paste includes a low temperature resistant additive.

7. The LED lamp forming material of claim 6, wherein the low temperature resistant additive is Diisodecyl Adipate (DIDA), Diisooctyl Adipate(DOA), Dioctyl Azelate (DOZ), Dibutyl Sebacate (DBS), Dioctyl Sebacate (DOS), or Diisooctyl Sebacate (DIOS).

8. The LED lamp forming material of claim 1, wherein the PVC paste or the modified PVC paste includes a stabilizer.

9. The LED lamp forming material of claim 8, wherein the stabilizer is octyl tin mercaptide, octyl tin oxide, bis (lauroyloxy) dioctyltin, dioctyl (maleate) tin, butylmercaptooxostannane, dibutyltin maleate, dibutyl tin laurate-maleate, dibutyl tin Ianrate-maleate, dibutyltin oxide, dimethyltin oxide, epoxidized soya bean oil, epoxidised linum usitatiseimum 1, or phosphite.

10. The LED lamp forming material of claim 1, wherein the PVC paste or the modified PVC paste includes a flame retardant plasticizer.

11. The LED lamp forming material of claim 10, wherein the flame retardant plasticizer is DP-45, tritolyl phosphate (TCP), triphenyl phosphate (TPP), tributyl phosphate(TBP), tris(2-ethylhexy) phosphate(TOP), or 2-Ethylhexyl diphenyl phosphate(DPOP).

12. The LED lamp forming material of claim 1. wherein the LED lamp is made up of one or more than one LED light sources.

13. The LED lamp forming material of claim 1, wherein the LED lamp includes a LED driving circuit.

14. The LED lamp forming material of claim 1, wherein the LED lamp includes a LED driving circuit and a control chip.

15. A light-pervious waterproof LED lamp, comprising: a LED light source, which is made up of one or multiple arranged LEDs and hermetically encased by a PVC paste or a modified PVC paste to form a light-pervious waterproof light.

16. The light-pervious waterproof LED lamp of claim 15, wherein the LED lamp is made up of one or more than one LED light sources.

17. The light-pervious waterproof LED lamp of claim 15, wherein the LED lamp includes a LED driving circuit.

18. The light-pervious waterproof LED lamp of claim 15, wherein the LED lamp includes a LED driving circuit and a control chip.

19. The light-pervious waterproof LED lamp of claim 18, wherein a sealing structure without an air gap is formed among the LED light source, the driving circuit, the control chip and the PVC paste or the modified PVC paste.

20. A manufacturing method of a light-pervious waterproof LED lamp, comprising preparing a LED lamp forming mold according to a shape of the light-pervious waterproof light required by a user; suspending a circuit board including a driving circuit and an LED light source within a molding cavity of the LED lamp forming mold; injecting a PVC paste or a modified PVC paste into the molding cavity of the LED lamp forming mold, and heating for 15 to 30 minutes to solidify the PVC paste or the modified PVC paste within the molding cavity of the LED lamp forming mold; taking a solidified waterproof LED lamp out of the molding cavity of the LED lamp forming mold to obtain the light-pervious waterproof LED lamp.

21. The manufacturing method of a light-pervious waterproof LED lamp of claim 20, wherein the heating is operated by an oven or a drying tunnel.

* * * * *